(12) United States Patent     (10) Patent No.:   US 12,579,354 B2

Fouad     (45) Date of Patent:    Mar. 17, 2026

---

(54) CORRECT-BY-CONSTRUCTION FILLER CELL INSERTION

(71) Applicant: Siemens Industry Software Inc., Plano, TX (US)

(72) Inventor: Fady Fouad, Heliopolis (EG)

(73) Assignee: Siemens Industry Software Inc., Plano, TX (US)

( * ) Notice: Subject to any disclaimer, the term of this patent is extended or adjusted under 35 U.S.C. 154(b) by 581 days.

(21) Appl. No.: 17/997,271

(22) PCT Filed: Apr. 30, 2020

(86) PCT No.: PCT/US2020/030678
§ 371 (c)(1),
(2) Date: Oct. 27, 2022

(87) PCT Pub. No.: WO2021/221651
PCT Pub. Date: Nov. 4, 2021

(65) Prior Publication Data
US 2023/0169256 A1     Jun. 1, 2023

(51) Int. Cl.
*G06F 30/398*     (2020.01)
*G06F 30/392*     (2020.01)
*G06F 111/20*     (2020.01)

(52) U.S. Cl.
CPC .......... *G06F 30/398* (2020.01); *G06F 30/392* (2020.01); *G06F 2111/20* (2020.01)

(58) Field of Classification Search
CPC ... G06F 30/398; G06F 30/392; G06F 2111/20
See application file for complete search history.

(56) References Cited

U.S. PATENT DOCUMENTS

| | | | | |
|---|---|---|---|---|
| 7,565,638 B2 * | 7/2009 | Hoerold | ................ | G06F 30/398 |
| | | | | 716/55 |
| 8,826,212 B2 * | 9/2014 | Yeh | ........................ | G06F 30/392 |
| | | | | 716/55 |

(Continued)

FOREIGN PATENT DOCUMENTS

| | | |
|---|---|---|
| CN | 103853874 A | 6/2014 |
| CN | 109923542 A | 6/2019 |

OTHER PUBLICATIONS

PCT International Search Report and Written Opinion of International Searching Authority mailed Mar. 31, 2021 corresponding to PCT International Application No. PCT/US2020/030678 filed Apr. 30, 2020.

(Continued)

*Primary Examiner* — Nha T Nguyen

(57) ABSTRACT

This application discloses a computing system implementing a yield enhancer tool to extract characteristics of cells from a physical layout design for an integrated circuit, determine locations of vacant regions in the physical layout design, apply electrical design rules for manufacture of the integrated circuit to the extracted characteristics in order to identify cells in the physical layout design that would violate the electrical design rules. The computing system can select filler cells for the vacant regions based, at least in part, on extracted characteristics of the cells abutting the vacant regions and the electrical design rules, and insert the selected filler cells in the vacant regions of the physical design layout. The computing system can perform a design rule check operation, which applies the electrical design rules to the physical design layout having been inserted with the selected filler cells.

17 Claims, 6 Drawing Sheets

(56) References Cited

U.S. PATENT DOCUMENTS

| | | | | |
|---|---|---|---|---|
| 9,330,224 | B2* | 5/2016 | Ding | G06F 30/398 |
| 10,691,865 | B2* | 6/2020 | Huda | G06F 30/398 |
| 10,867,101 | B1* | 12/2020 | Lin | G06F 30/392 |
| 2005/0044522 | A1* | 2/2005 | Maeda | H10D 89/10 |
| | | | | 430/5 |
| 2008/0005712 | A1* | 1/2008 | Charlebois | G06F 30/392 |
| | | | | 716/122 |
| 2008/0120586 | A1 | 5/2008 | Hoerold | |
| 2009/0026502 | A1* | 1/2009 | Wu | H10D 89/611 |
| | | | | 257/E27.07 |
| 2009/0113368 | A1* | 4/2009 | Lin | G06F 30/39 |
| | | | | 716/122 |
| 2014/0165020 | A1* | 6/2014 | Yeh | G06F 30/392 |
| | | | | 716/122 |
| 2015/0186591 | A1 | 7/2015 | Gurney et al. | |
| 2015/0317425 | A1* | 11/2015 | Ding | G06F 30/398 |
| | | | | 716/112 |
| 2016/0092624 | A1* | 3/2016 | Somayaji | G06F 30/392 |
| | | | | 716/119 |
| 2016/0110489 | A1* | 4/2016 | Schroeder | G06F 30/392 |
| | | | | 716/119 |
| 2016/0292341 | A1* | 10/2016 | Sukharev | G06F 30/392 |
| 2017/0091368 | A1* | 3/2017 | Wang | H10D 84/907 |
| 2018/0006010 | A1* | 1/2018 | Lo | H10B 10/00 |
| 2018/0314783 | A1* | 11/2018 | Moroz | G06F 30/367 |
| 2020/0074042 | A1* | 3/2020 | Biswas | G06F 30/398 |
| 2020/0151298 | A1* | 5/2020 | Kim | G06F 30/392 |
| 2020/0226229 | A1* | 7/2020 | Liu | G06F 30/367 |
| 2020/0272781 | A1* | 8/2020 | Chang | G06F 30/398 |
| 2022/0358276 | A1* | 11/2022 | Hu | G06F 30/398 |
| 2023/0267263 | A1* | 8/2023 | Chang | H10D 89/10 |
| | | | | 257/204 |

OTHER PUBLICATIONS

Kai-Han Tseng et al: "Minimum-Implant-Area-Aware Detailed Placement with Spacing Constraints", Proceedings of the 53rd Annual Design Automation Conference on, DAC '16, ACM Press, Jun. 5, 2016 (Jun. 5, 2016), pp. 1-6, New York, New York, USA.

Lei Seong-I et al: "Minimum Implant Area-Aware Placement and Threshold Voltage Refinement", 2016 21st Asia and South Pacific Design Automation Conference (ASP-DAC), IEEE, Jan. 25, 2016 (Jan. 25, 2016), pp. 192-197.

Liu Yi; Fast Timing Convergence Considering Physical Layout and Routing Constraints; China Integrated Circuit Feb. 5, 2016.

* cited by examiner

300

PHYSICAL LAYOUT DESIGN

MARKED PHYSICAL LAYOUT DESIGN

STANDARD CELLS 402

CELL ROWS 401

CELL REFERENCES 404

FILLED PHYSICAL LAYOUT DESIGN

STANDARD CELLS 402

CELL ROWS 401

FILLER CELLS 405

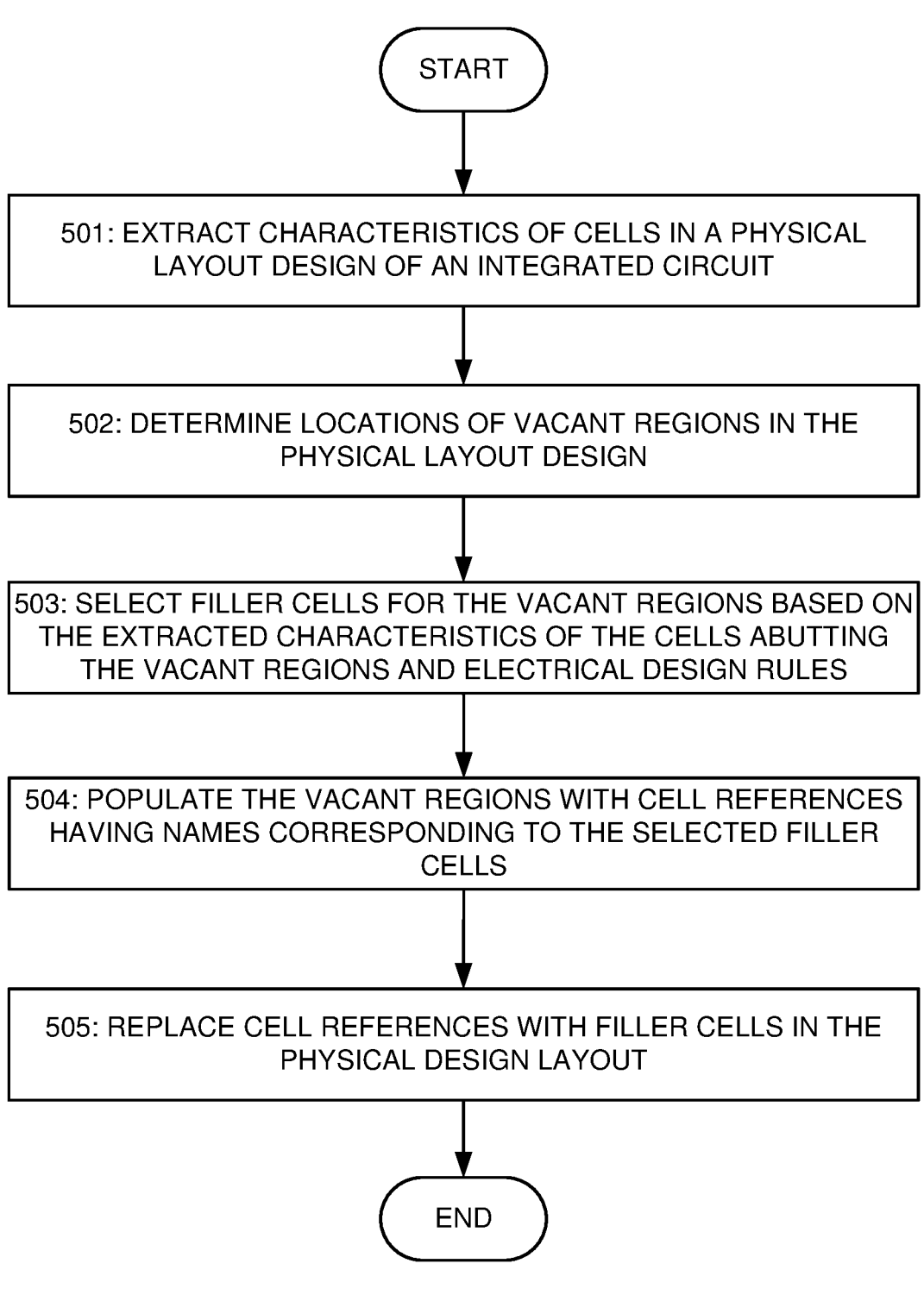

START

501: EXTRACT CHARACTERISTICS OF CELLS IN A PHYSICAL LAYOUT DESIGN OF AN INTEGRATED CIRCUIT

502: DETERMINE LOCATIONS OF VACANT REGIONS IN THE PHYSICAL LAYOUT DESIGN

503: SELECT FILLER CELLS FOR THE VACANT REGIONS BASED ON THE EXTRACTED CHARACTERISTICS OF THE CELLS ABUTTING THE VACANT REGIONS AND ELECTRICAL DESIGN RULES

504: POPULATE THE VACANT REGIONS WITH CELL REFERENCES HAVING NAMES CORRESPONDING TO THE SELECTED FILLER CELLS

505: REPLACE CELL REFERENCES WITH FILLER CELLS IN THE PHYSICAL DESIGN LAYOUT

END

FIG. 5

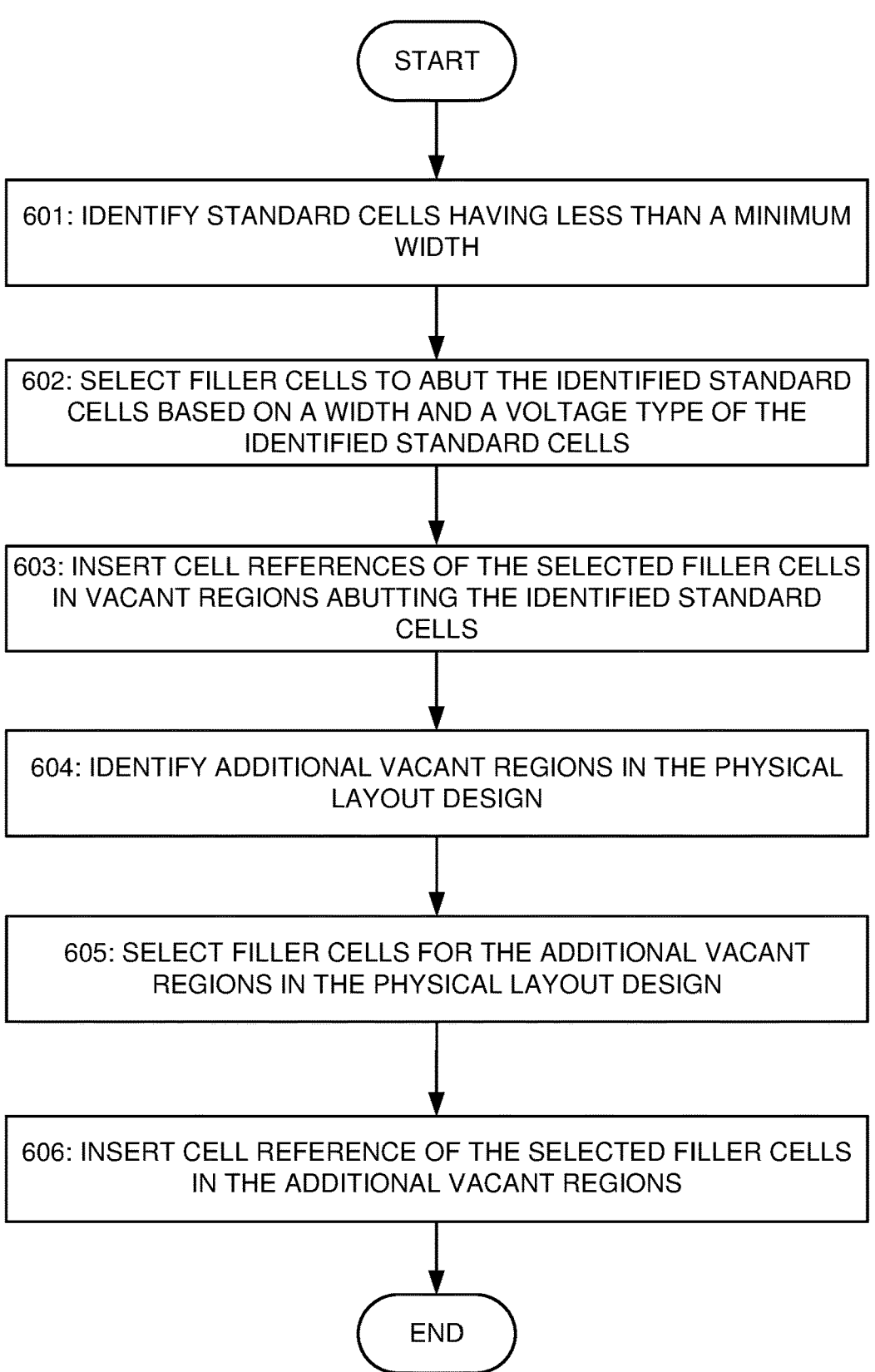

START

601: IDENTIFY STANDARD CELLS HAVING LESS THAN A MINIMUM WIDTH

602: SELECT FILLER CELLS TO ABUT THE IDENTIFIED STANDARD CELLS BASED ON A WIDTH AND A VOLTAGE TYPE OF THE IDENTIFIED STANDARD CELLS

603: INSERT CELL REFERENCES OF THE SELECTED FILLER CELLS IN VACANT REGIONS ABUTTING THE IDENTIFIED STANDARD CELLS

604: IDENTIFY ADDITIONAL VACANT REGIONS IN THE PHYSICAL LAYOUT DESIGN

605: SELECT FILLER CELLS FOR THE ADDITIONAL VACANT REGIONS IN THE PHYSICAL LAYOUT DESIGN

606: INSERT CELL REFERENCE OF THE SELECTED FILLER CELLS IN THE ADDITIONAL VACANT REGIONS

END

FIG. 6

CORRECT-BY-CONSTRUCTION FILLER CELL INSERTION

TECHNICAL FIELD

This application is generally related to electronic design automation and, more specifically, to correct-by-construction filler cell insertion in a physical layout design.

BACKGROUND

Designing and fabricating integrated circuits typically involves many steps, known as a design flow. The particular steps of a design flow often are dependent upon the type of integrated circuit being designed, its complexity, the design team, and the fabricator or foundry that will manufacture the integrated circuits. The design flow typically starts with a specification for a new integrated circuits, which can be transformed into a logical design. The logical design can model the integrated circuit at a register transfer level (RTL), which is usually coded in a Hardware Design Language (HDL), such as System Verilog, Very high speed integrated circuit Hardware Design Language (VHDL), System C, or the like. The logical design of the integrated circuit can be analyzed to confirm that it will accurately perform the functions desired for the integrated circuit. This analysis is sometimes referred to as "functional verification."

After the accuracy of the logical design is confirmed, it can be converted into a device design by synthesis software. The device design, which is typically in the form of a schematic or netlist, describes the specific components, such as transistors, resistors, and capacitors, which can be used in the electronic system, along with their interconnections. This device design generally corresponds to the level of representation displayed in conventional circuit diagrams.

The device design can be transformed into physical design data describing specific geometric elements, often referred to as a physical layout design. These geometric elements, typically polygons, define the shapes that will be created in various materials to form the specified circuit devices. A designer, for example, using a place-and-route tool, can place portions of the device design relative to each other in a geographic design environment. While these device design portions can correspond to segments of code in a hardware description language, they typically are shown in the geographic design environment as cells representing components of the integrated circuit. Once the cells have been placed relative to each other, wiring lines can be routed between the cells. These wiring lines represent the interconnections, such as data signal interconnections and clock signal interconnections, which can be formed between the circuit devices of the integrated circuit.

Since the physical layout design can include open spaces between its cells that will correspond to electrical errors in a subsequent design rule check process, the place-and-route process also typically includes a gap filling procedure that inserts filler cells in the open spaces between the cells. The filler cells can be non-functional cells, such as non-functional transistors, which, for example, can be used to continue voltage rails, n-wells, and/or p-wells for layer continuity and alignment. Since there many differing types of filler cells, the place-and-route tool often performs a guess-and-check procedure to insert filler cells, for example, iteratively performing the gap filling procedure and a design rule check process to determine whether the filler cells eliminate electrical errors. This iterative process of the place-and-route tool inserting filler cells and the design rule check tool identifying which filler cells are inadequate can often take hours to resolve, consuming processing and memory resources. Furthermore, each time a designer makes a logic or timing change the physical layout design, the filler cell insertion process is repeated by the place-and-route tool and the design rule check tool, which exacerbates the time delay and computing resource utilization, rendering filler cell insertion a bottleneck in the design process.

SUMMARY

This application discloses a computing system implementing a yield enhancer tool to extract characteristics of cells from a physical layout design for an integrated circuit, determine locations of vacant regions in the physical layout design, apply electrical design rules for manufacture of the integrated circuit to the extracted characteristics in order to identify cells in the physical layout design that would violate the electrical design rules. The computing system can select filler cells for the vacant regions based, at least in part, on extracted characteristics of the cells abutting the vacant regions and the electrical design rules, and insert the selected filler cells in the vacant regions of the physical design layout. The computing system can perform a design rule check operation, which applies the electrical design rules to the physical design layout having been inserted with the selected filler cells. Embodiments of will be described below in greater detail.

DESCRIPTION OF THE DRAWINGS

FIG. 5 illustrates a flowchart showing implementation of correct-by-construction filler cell insertion for a circuit design layout according to various examples.

FIG. 6 illustrates a flowchart showing an example implementation of filler cell selection for insertion into vacant regions of a physical layout design according to various examples.

DETAILED DESCRIPTION

Illustrative Operating Environment

Figure 1:
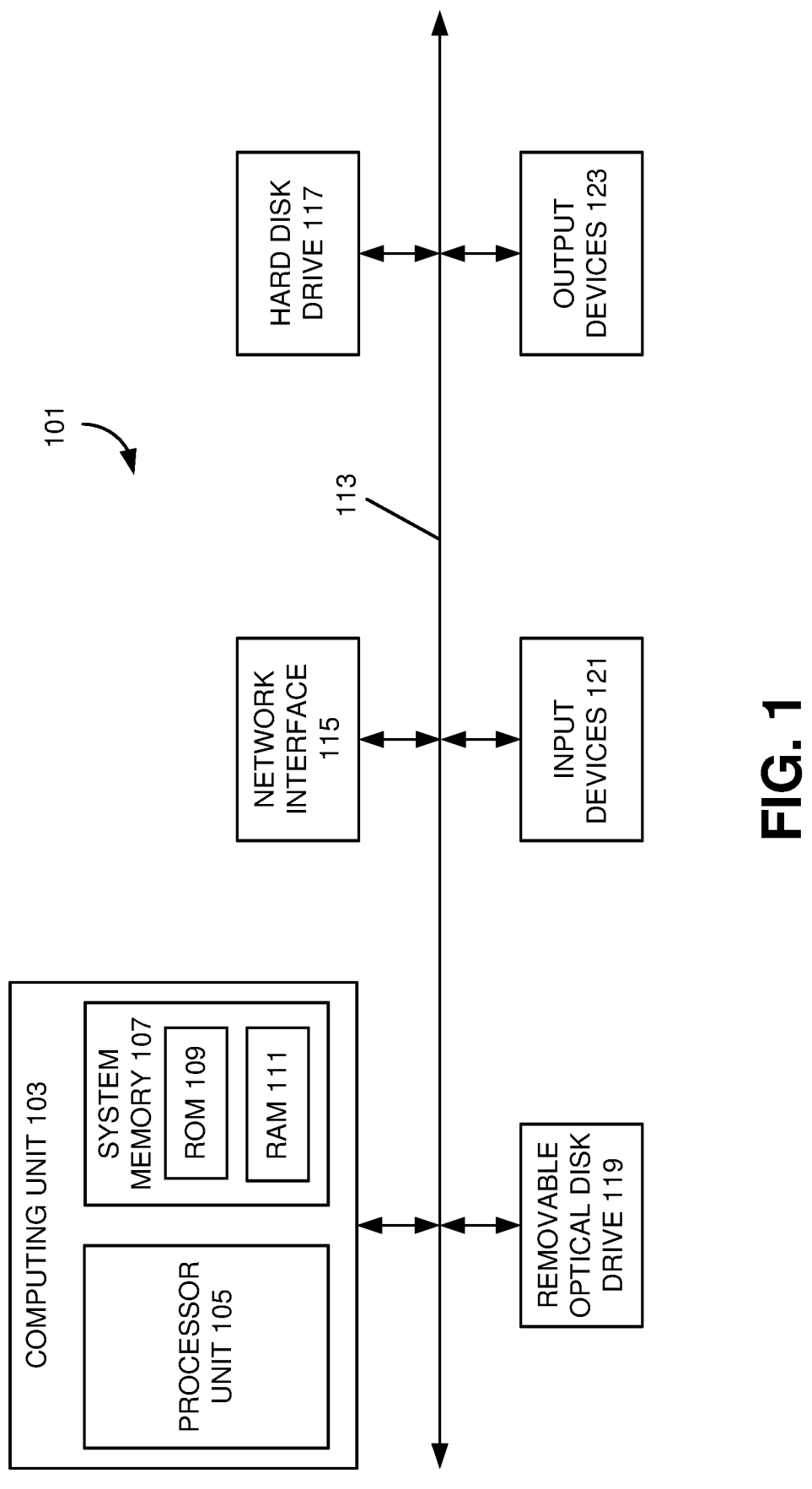
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processor unit 105 and a system memory 107. The processor unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processor unit 105.

The processor unit 105 and the system memory 107 are connected, either directly or indirectly, through a bus 113 or alternate communication structure, to one or more peripheral devices 115-123. For example, the processor unit 105 or the system memory 107 may be directly or indirectly connected to one or more additional memory storage devices, such as a hard disk drive 117, which can be magnetic and/or removable, a removable optical disk drive 119, and/or a flash memory card. The processor unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
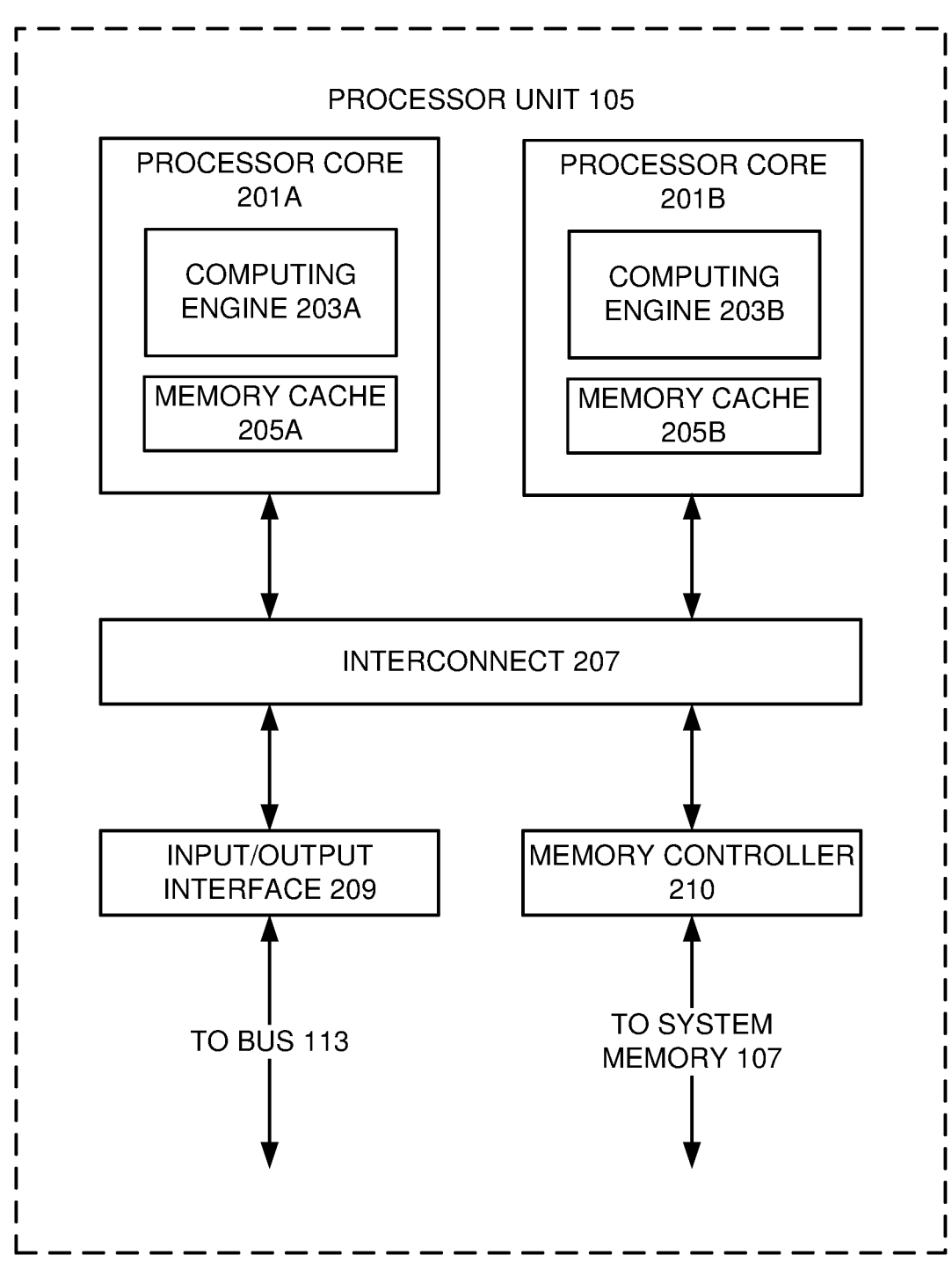

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and is not intended to suggest any limitation as to the scope of use or functionality of alternate embodiments.

Correct-by-Construction Filler Cell Insertion

Figure 3:
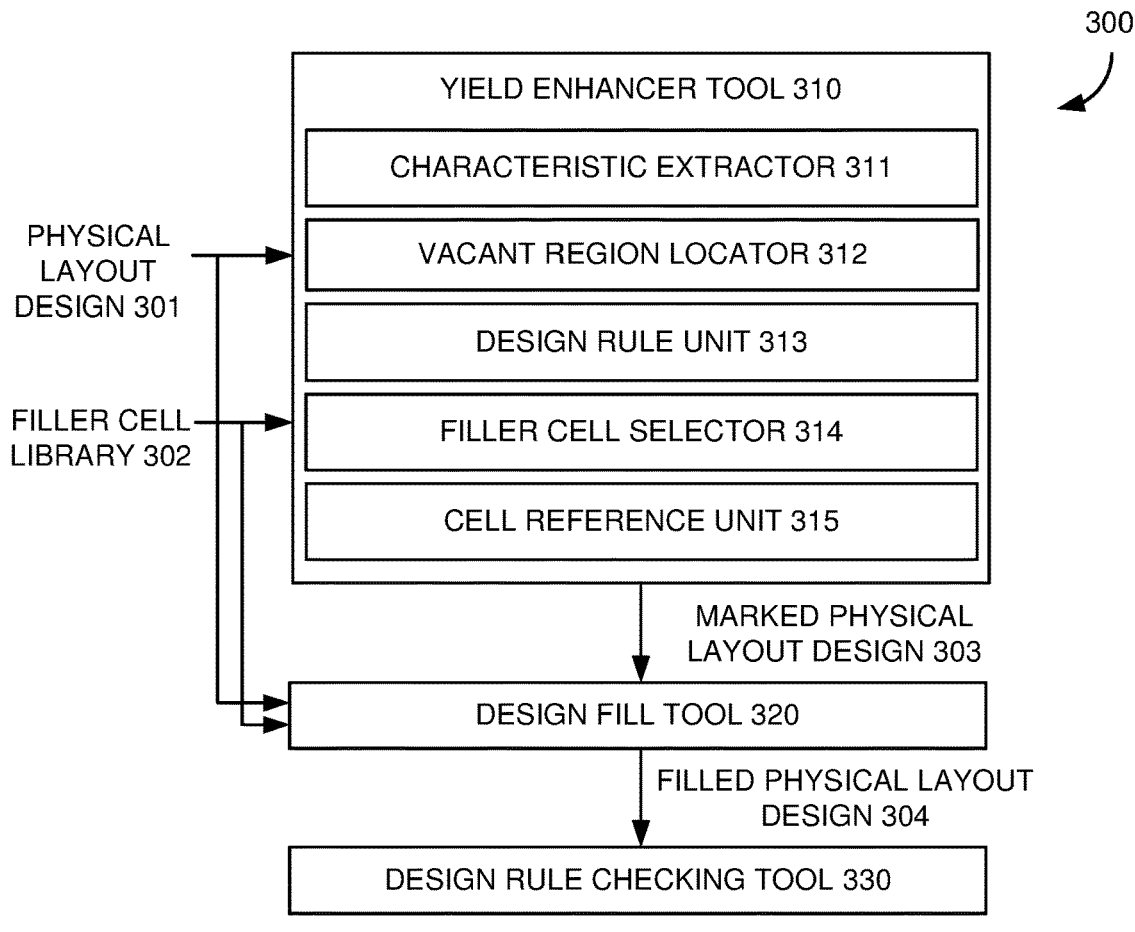
FIG. 3 illustrates an example system to perform correct-by-construction filler cell insertion for a physical layout design that may be implemented according to various embodiments.

FIG. 3 illustrates an example system 300 to perform correct-by-construction filler cell insertion for a physical layout design 301 that may be implemented according to various embodiments. Referring to FIG. 3, the system 300 can include a yield enhancer tool 310 to receive the physical layout design 301, for example, from a place-and-route tool, which can place standard cells in a geometric layout and then place wiring lines representing data signal interconnections, clock signal interconnections, power and ground connections, or the like, between the standard cells. In some embodiments, the physical layout design 301 can include placed standard cells, but not include wiring lines; while, in other embodiments, the physical layout design 301 can include both standard cells and the corresponding wiring lines.

The physical layout design 301 can describe an integrated circuit with geometrical information capable of being utilized in the manufacturing the integrated circuit, for example, in terms of planar geometric shapes corresponding to patterns of metal, oxide, or semiconductor layers that make up components of the integrated circuit. In some embodiments, the physical layout design 301 can be specified in a Graphic Data System II (GDSII) format, an Open Artwork System Interchange Standard (OASIS) format, Library Exchange Format (LEF) and a Design Exchange Format (DEF), or the like.

Figure 4A:
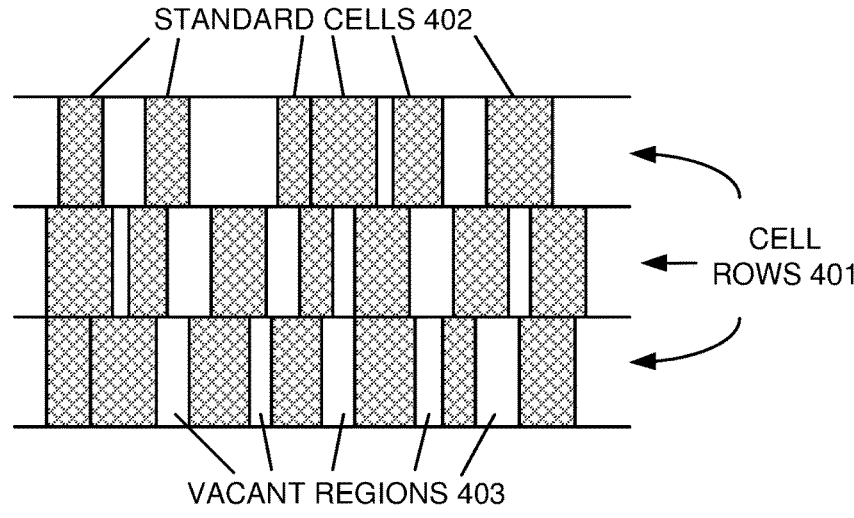
FIGS. 4A-4C illustrates example physical layout design with vacant regions populated with filler cells according to various embodiments.

FIG. 4A illustrates an example section of a physical layout design with vacant regions 403 according to various embodiments. Referring to FIG. 4A, the section of the physical layout design can include multiple cell rows 401 in a geometric layout area, which can include multiple standard cells 402. The height of each of the cell rows can correspond to a height of the standard cells 402. The width of the standard cells 402 in the cells rows 401 can vary depending on cell type. Each of the standard cells 402 also can have varying voltage types or threshold voltage levels, such as standard voltage, low voltage, ultra-low voltage, or the like.

The section of the physical layout design also can include vacant regions 403 adjacent to at least one of the standard cells 402, which can prompt design rule violations, for example, due to a lack of continuation of voltage rails, n-wells, and/or p-wells.

Referring back to FIG. 3, the yield enhancer tool 310 can receive a filler cell library 302 to describe filler cells capable of be inserted into open areas of the physical layout design 301. The filler cells can be non-functional cells, such as non-functional transistors, ECO (Engineering Change Order) metal 1 decapacitance cells, or the like, which, for example, can be used to continue voltage rails, n-wells, and/or p-wells for layer continuity and alignment. In some embodiments, the filler cell library 302 can be provided from a foundry or manufacturer capable of fabricating the integrated circuit described in the physical layout design 301, and can describe the filler cells in a Graphic Data System II (GDSII) format, an Open Artwork System Interchange Standard (OASIS) format, Library Exchange Format (LEF) and a Design Exchange Format (DEF), or the like.

The yield enhancer tool 310 can include a characteristic extractor 311 to identify the cells placed in the physical design layout 301 and determine their characteristics. For example, the characteristic extractor 311 can ascertain a voltage type or threshold voltage level, such as standard voltage, low voltage, ultra-low voltage, or the like, for each of the cells in the physical layout design 301. The characteristic extractor 311 also can measure a width of the cells in the physical layout design 301. The combination of the voltage type and the width can correspond to at least some of the characteristics of the cells in the physical layout design 301.

The yield enhancer tool 310 can include a vacant region locator 312 to identify open areas in the physical layout design 301 or gaps between the cells in the physical layout design 301, which can correspond to vacant regions of the physical layout design 301. The vacant region locator 312 also can determine which cells in the physical layout design 301 abut or are adjacent to the vacant regions in the physical layout design 301.

The yield enhancer tool 310 can include a design rule unit 313 to determine whether the extracted characteristics of the cells in the physical layout design 301 correspond to potential design rule violations. For example, when a subsequent design rule checking process includes a design rule requiring a minimum width for cells in the physical layout design 301, the design rule unit 313 can identify any cells in the physical layout design 301 having a width less than the minimum width. In some embodiments, the design rule unit 313 can flag the cells having a width that would cause a design rule violation in the subsequent design rule checking process.

The yield enhancer tool 310 can include a filler cell selector 314 to select filler cells from the filler cell library 302 to be populated into the vacant regions identified by the vacant region locator 312. The physical layout design 301, once the vacant regions have been replaced with the selected filler cells, should eliminate design rule violations that would have occurred had the vacant regions remained in the physical layout design 301.

In some embodiments, the filler cell selector 314 can utilize the extracted characteristics of the cells in the physical layout design 301 to select the filler cells for the vacant regions. For example, the filler cell selector 314 can determine those cells having been flagged for being smaller than a minimum width and can select filler cells for insertion into vacant regions adjacent to the flagged cells. In some embodiments, the filler cell selector 314 can select the filler cells having a same voltage type as the flagged cell and having a width such that the combination of the flagged cell width and the filler cell width meets or exceeds the minimum width of a design rule. Since filler cells can be seen as expansions of the cells in the physical layout design 301, an insertion of the selected filler cell next to a flagged cell can eliminate a potential design rule violation in a subsequent design rule checking process due to lacking a minimum width of the flagged cell.

The filler cell selector 314, in some embodiments, can expand the flagged cells in the physical layout design 301 by selecting filler cells to be placed in vacant regions adjacent to the flagged cells before selecting filler cells for the remaining vacant regions in the physical layout design 301. The filler cell selector 314 can select filler cells for the remaining vacant regions based on the extracted characteristics of the cells in the physical layout design 301 and user-based priority. For example, the filler cell selector 314 can select filler cells for the remaining vacant regions to have voltage types corresponding to cells adjacent the vacant regions and, when there is an option of two different voltage types, select filler cells based on a prioritized order of voltage types. The filler cell selector 314 also can select filler cells for the remaining vacant regions to minimize a number of filler cells, for example, selecting the largest filler cells as possible to fill the remaining vacant regions.

The yield enhancer tool 310 can include a cell reference unit 315 to generate a cell reference for each of the selected filler cells. Each cell reference can correspond to an empty cell having a name of the corresponding selected filler cell, as used in the filler cell library 302, and optionally including the voltage type and the width of the corresponding selected filler cell. The cell reference unit 315 can insert the cell references into the physical layout design 301, which can generate a marked physical layout design 303.

Figure 4B:
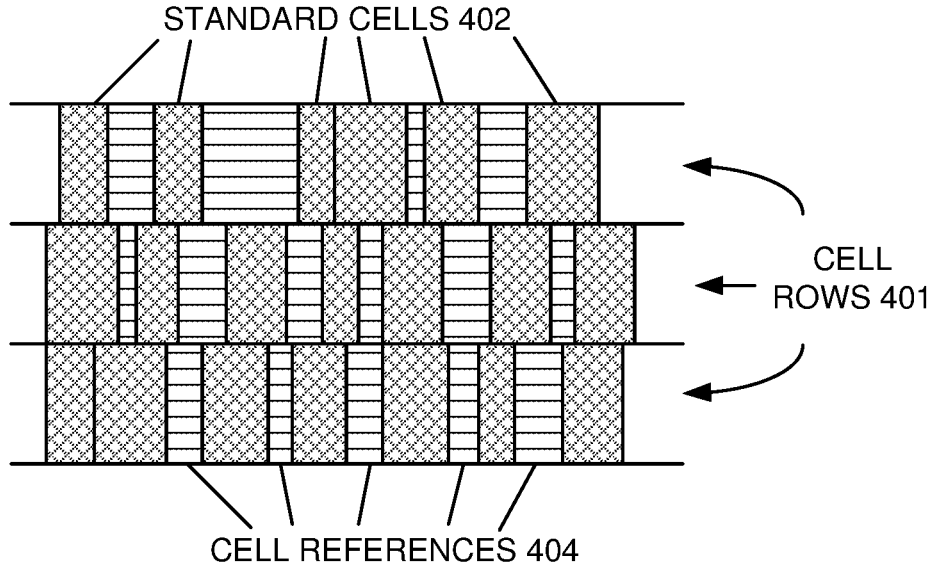

FIG. 4B illustrates an example section of a marked physical layout design populated with cell references 404 according to various embodiments. Referring to FIG. 4B, the section of the marked physical layout design can be similar to the section of the physical layout design described above with reference to FIG. 4A except the vacant regions 403 adjacent to at least one of the standard cells 402 shown in FIG. 4A have been replaced with cell references 404 in FIG. 4B. The cell references can correspond to empty cells, each having a name of a selected filler cell, as used in a filler cell library, and optionally including a voltage type and a width of the selected filler cell.

Referring back to FIG. 3, the system 300 can include a design fill tool 320 to receive the marked physical layout design 303 from the yield enhancer tool 310 and the filler library 302. The design fill tool 320 can traverse the marked physical layout design 303 to identify the cell references, and utilize the cell references to look-up corresponding filler cells in the filler cell library 302. In some embodiments, the design fill tool 320 can parse each cell reference to identify a corresponding name of a filler cell and optionally the voltage type and the width of the filler cell. The design fill tool 320 can utilize the filler cell name possibly along with the voltage type and/or width to search the filler cell library 302 for a filler cell indicated by the cell reference. The design fill tool 320 can remove the cell references from the marked physical layout design 303 and insert the filler cells from the filler cell library 302 into the locations previously occupied by the cell references, which generates a filled physical layout design 304.

Figure 4C:
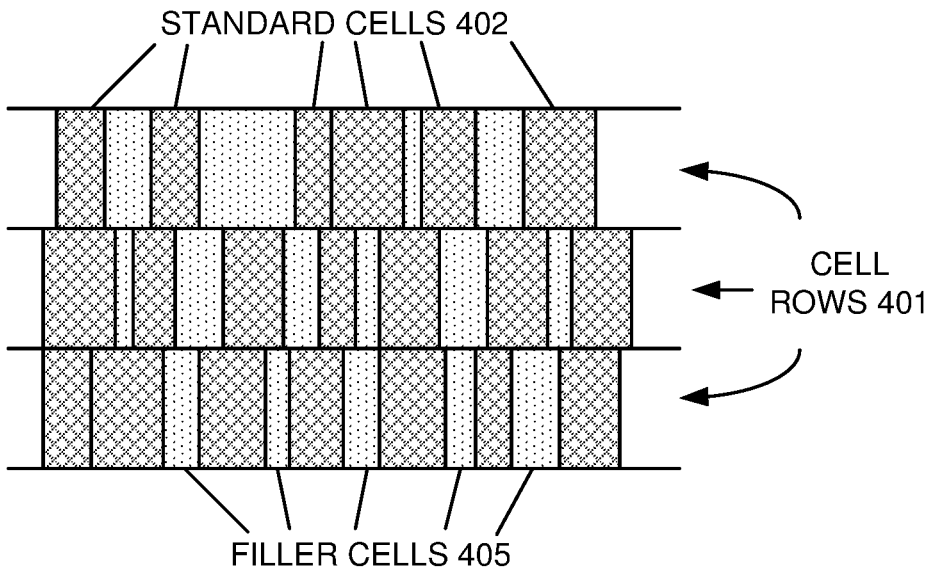

FIG. 4C illustrates an example section of a filled physical layout design populated with filler cells 405 according to various embodiments. Referring to FIG. 4C, the section of the filled physical layout design can be similar to the section of the marked physical layout design described above with reference to FIG. 4B except the cell references 404 shown in FIG. 4B have been replaced with filler cells 405 in FIG. 4C. The cell references 404 in FIG. 4B included names of the filler cells 405 that have been populated into the section of the filled physical layout design.

Referring back to FIG. 3, the system 300 can include a design rule checking tool 330 to receive the filled physical layout design 304, which can include the cells from the physical layout design 301 with filler cells populated into previously vacant regions of the physical layout design 301. The design rule checking tool 330 can perform design rule checking operations on the filled physical layout design 304, for example, by applying electrical design rules against the geometric information in the filled physical layout design 304 to determine whether any violations exist. Since the yield enhancer tool 310 and design fill tool 320 have selected the filler cells that were inserted into the filled physical layout design 304 based, at least in part, on the design rules applied during a design rule checking process by the design rule checking tool 330, the filler cells were correct-by-construction and thus eliminated potential design rule violations that would have occurred without their insertion.

FIG. 5 illustrates a flowchart showing implementation of correct-by-construction filler cell insertion for a circuit design layout according to various examples. Referring to FIG. 5, in a block 501, a computing system implementing a yield enhancer tool can extract characteristics of cells in a physical layout design of an integrated circuit. The physical layout design can describe the integrated circuit with geometrical information capable of being utilized in the manufacturing the integrated circuit, for example, in terms of planar geometric shapes corresponding to patterns of metal, oxide, or semiconductor layers that make up components of the integrated circuit. In some embodiments, the physical layout design can be specified in a Graphic Data System II (GDSII) format, an Open Artwork System Interchange Standard (OASIS) format, Library Exchange Format (LEF) and a Design Exchange Format (DEF), or the like.

The computing system implementing the yield enhancer tool can identify the cells placed in the physical design layout and determine their characteristics. For example, the computing system implementing the yield enhancer tool can ascertain a voltage type or threshold voltage level, such as standard voltage, low voltage, ultra-low voltage, or the like, for each of the cells in the physical layout design. The computing system implementing the yield enhancer tool also can measure a width of the cells in the physical layout design. The combination of the voltage type and the width can correspond to at least some of the characteristics of the cells in the physical layout design.

In a block 502, the computing system implementing the yield enhancer tool can determine locations of vacant regions in the physical layout design. The computing system implementing the yield enhancer tool can identify open areas in the physical layout design or gaps between the cells in the physical layout design, which can correspond to vacant regions of the physical layout design. The computing system implementing the yield enhancer tool also can determine which cells in the physical layout design abut or are adjacent to the vacant regions in the physical layout design.

In a block 503, the computing system implementing the yield enhancer tool can select filler cells for the vacant regions based, at least in part, on the extracted characteristics of the cells abutting the vacant regions and electrical design rules for manufacture of the integrated circuit. The computing system implementing the yield enhancer tool can determine whether the extracted characteristics of the cells in the physical layout design correspond to potential design rule violations. For example, when a subsequent design rule checking process includes a design rule requiring a minimum width for cells in the physical layout design, the computing system implementing the yield enhancer tool can identify any cells in the physical layout design having a width less than the minimum width. The computing system implementing the yield enhancer tool can select filler cells that, when inserted into the vacant regions of the physical layout design, can eliminate the potential design rule violations, for example, by expanding those cells having width less than the minimum width with the filler cells. In some embodiments, the selected filler cells have a voltage type that matches the voltage type in the extracted characteristics of the cells abutting the vacant regions.

In a block 504, the computing system implementing the yield enhancer tool can populate the vacant regions of the physical layout design with cell references having names corresponding to the selected filler cells. The computing system implementing the yield enhancer tool can generate the cell references for each of the selected filler cells. Each cell reference can correspond to an empty cell having a name of the corresponding selected filler cell, as used in a filler cell library, and optionally including a voltage type and a width of the corresponding selected filler cell. The computing system implementing the yield enhancer tool can insert the cell references into the physical layout design.

In a block 505, the computing system implementing a cell fill tool can replace the cell references with filler cells in the physical design layout. The cell fill tool can traverse the physical layout design to identify the cell references, and utilize the cell references to look-up corresponding filler cells in the filler cell library. In some embodiments, the cell fill tool can parse each cell reference to identify a corresponding name of a filler cell and optionally the voltage type and the width of the filler cell. The cell fill tool can utilize the filler cell name possibly along with the voltage type and/or width to search the filler cell library for a filler cell indicated by the cell reference. The cell fill tool can remove the cell references from the physical layout design and insert the filler cells from the filler cell library into the locations previously occupied by the cell references.

FIG. 6 illustrates a flowchart showing an example implementation of filler cell selection for insertion into vacant regions of a physical layout design according to various examples. Referring to FIG. 6, in a block 601, a computing system implementing a yield enhancer tool can identify standard cells in a physical layout design having less than a minimum width. In some embodiments, the computing system implementing the yield enhancer tool can measure the standard cells in the physical layout design to identify their width and then compare that width to the minimum width associated with a design rule. In some embodiments, the computing system implementing the yield enhancer tool can flag the standard cells smaller than the minimum width in the physical layout design.

In a block 602, the computing system implementing the yield enhancer tool can select filler cells to abut the identified standard cells based on a width and a voltage type of the identified standard cells. The computing system implementing the yield enhancer tool can identify vacant regions adjacent to flagged standard cells and identify sets of filler cells that can be selected for insertion in the identified vacant regions. In some embodiments, each set of filler cells can include those filler cells having a matching voltage type to a corresponding flagged standard cell and those filler cells having a correct width. The correct width can be less than the width of the vacant region adjacent to the corresponding flagged standard cell and be large enough that a combination of its width and the width of the flagged standard cell exceeds the minimum width. In some embodiments, the computing system implementing the yield enhancer tool can select the filler cells from the identified set of filler cells.

In a block 603, the computing system implementing the yield enhancer tool can insert cell references of the selected filler cells in vacant regions abutting the identified standard cells. The computing system implementing the yield enhancer tool can generate a cell reference for each of the selected filler cells. Each cell reference can correspond to an empty cell having a name of the corresponding selected filler cell, as used in a filler cell library, and optionally including the voltage type and the width of the corresponding selected filler cell. The computing system implementing the yield enhancer tool can insert the cell references into the physical layout design.

In a block 604, the computing system implementing the yield enhancer tool can identify additional vacant regions in the physical layout design. The computing system implementing the yield enhancer tool can identify open areas in the physical layout design or gaps between the cells in the physical layout design. When the open areas do not already include a cell reference populated into the physical layout design in the block 603, the computing system implementing the yield enhancer tool can determine the open spaces correspond to additional vacant regions of the physical layout design. The computing system implementing the yield enhancer tool also can determine which cells in the physical layout design abut or are adjacent to the vacant regions in the physical layout design.

In a block 605, the computing system implementing the yield enhancer tool can select filler cells for the additional vacant regions in the physical layout design. The computing system implementing the yield enhancer tool can select filler cells for the additional vacant regions based on the extracted characteristics of the cells in the physical layout design and user-based priority. For example, the computing system implementing the yield enhancer tool can select filler cells for the additional vacant regions to have voltage types corresponding to cells adjacent the vacant regions and, when there is an option of two different voltage types, select filler cells based on a prioritized order of voltage types. The computing system implementing the yield enhancer tool also can select filler cells for the additional vacant regions to minimize a number of filler cells, for example, selecting the largest filler cells as possible to fill the remaining vacant regions.

In a block 606, the computing system implementing the yield enhancer tool can insert cell references of the selected filler cells in the additional vacant regions. The computing system implementing the yield enhancer tool can generate a cell reference for each of the selected filler cells. Each cell reference can correspond to an empty cell having a name of the corresponding selected filler cell, as used in a filler cell library, and optionally including the voltage type and the width of the corresponding selected filler cell. The computing system implementing the yield enhancer tool can insert the cell references into the additional vacant regions identified in the physical layout design.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to design processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:

extracting, by a computing system, characteristics of cells from a physical layout design for an integrated circuit;

determining, by the computing system, locations of vacant regions in the physical layout design;

selecting, by the computing system, filler cells for the vacant regions based, at least in part, on extracted characteristics of the cells abutting the vacant regions and one or more electrical design rules for manufacture of the integrated circuit;

generating, by the computing system, a reference cell for each of the selected filler cells, wherein each reference cell corresponds to an empty cell having a name of the corresponding selected filler cell;

populating, by the computing system, the vacant regions in the physical layout design with reference cells associated with the selected filler cells; and replacing, by the computing system, the reference cells populated in the physical layout design with the selected filler cells based, at least in part, on the names in the reference cells.

2. The method of claim 1, wherein selecting the filler cells for the vacant regions further comprises:

identifying one or more of the cells in the physical layout design have sizes that would violate at least one of the electrical design rules;

determining sizes and types of the filler cells that, when placed adjacent to the identified cells in the physical layout design, would eliminate electrical design rule violations; and selecting the filler cells for at least a subset of the vacant regions based, at least in part, on the determined sizes and types of the filler cells.

3. The method of claim 2, wherein, after selecting the filler cells for at least the subset of the vacant regions, identifying another subset of the vacant regions in the physical layout design and selecting the filler cells for the other subset of the vacant regions.

4. The method of claim 1, wherein replacing the reference cells with the selected filler cells further comprises:

searching a filler cell library using the names in the reference cells to identify the selected filler cells; and inserting the selected filler cells from the filler cell library into locations of the physical design layout previously occupied by the cell references.

5. The method of claim 1, further comprising performing, by the computing system, a design rule check operation, which applies the electrical design rules to the physical design layout having been inserted with the selected filler cells.

6. The method of claim 1, wherein the extracted characteristics of the cells abutting the vacant regions include at least one of threshold voltages of the cells and the sizes of the cells.

7. A system comprising:

a memory system configured to store computer-executable instructions; and a computing system, in response to execution of the computer-executable instructions, is configured to:

extract characteristics of cells from a physical layout design for an integrated circuit;

determine locations of vacant regions in the physical layout design;

select filler cells for the vacant regions based, at least in part, on extracted characteristics of the cells abutting the vacant regions and one or more electrical design rules for manufacture of the integrated circuit;

generate a reference cell for each of the selected filler cells, wherein each reference cell corresponds to an empty cell having a name of the corresponding selected filler cell;

populate the vacant regions in the physical layout design with reference cells associated with the selected filler cells; and replace the reference cells populated in the physical layout design with the selected filler cells based, at least in part, on the names in the reference cells.

8. The system of claim 7, wherein the computing system, in response to execution of the computer-executable instructions, is further configured to select the filler cells for the vacant regions by:

identifying one or more of the cells in the physical layout design have sizes that would violate at least one of the electrical design rules;

determining sizes and types of the filler cells that, when placed adjacent to the identified cells in the physical layout design, would eliminate electrical design rule violations; and selecting the filler cells for at least a subset of the vacant regions based, at least in part, on the determined sizes and types of the filler cells.

9. The system of claim 8, wherein the computing system, in response to execution of the computer-executable instructions, is further configured to, after selecting the filler cells for at least the subset of the vacant regions, identify another subset of the vacant regions in the physical layout design and select the filler cells for the other subset of the vacant regions.

10. The system of claim 7, wherein the computing system, in response to execution of the computer-executable instructions, is further configured to replace the reference cells with the selected filler cells by:

searching a filler cell library using the names in the reference cells to identify the selected filler cells; and inserting the selected filler cells from the filler cell library into locations of the physical design layout previously occupied by the cell references.

11. The system of claim 7, wherein the computing system, in response to execution of the computer-executable instructions, is further configured to: perform a design rule check operation, which applies the electrical design rules to the physical design layout having been inserted with the selected filler cells.

12. An apparatus comprising at least one computer-readable memory device storing instructions configured to cause one or more processing devices to perform operations comprising:

extracting characteristics of cells from a physical layout design for an integrated circuit;

determining locations of vacant regions in the physical layout design;

selecting filler cells for the vacant regions based, at least in part, on extracted characteristics of the cells abutting the vacant regions and one or more electrical design rules for manufacture of the integrated circuit;

generating a reference cell for each of the selected filler cells, wherein each reference cell corresponds to an empty cell having a name of the corresponding selected filler cell;

populating the vacant regions in the physical layout design with reference cells associated with the selected filler cells; and replacing the reference cells populated in the physical layout design with the selected filler cells based, at least in part, on the names in the reference cells.

13. The apparatus of claim 12, wherein selecting the filler cells for the vacant regions further comprises:

identifying one or more of the cells in the physical layout design have sizes that would violate at least one of the electrical design rules;

determining sizes and types of the filler cells that, when placed adjacent to the identified cells in the physical layout design, would eliminate electrical design rule violations; and selecting the filler cells for at least a subset of the vacant regions based, at least in part, on the determined sizes and types of the filler cells.

14. The apparatus of claim 13, wherein, after selecting the filler cells for at least the subset of the vacant regions, identifying another subset of the vacant regions in the physical layout design and selecting the filler cells for the other subset of the vacant regions.

15. The apparatus of claim 12, wherein replacing the reference cells with the selected filler cells further comprises:

searching a filler cell library using the names in the reference cells to identify the selected filler cells; and inserting the selected filler cells from the filler cell library into locations of the physical design layout previously occupied by the cell references.

16. The apparatus of claim 12, wherein the instructions are configured to cause one or more processing devices to perform operations further comprising performing a design rule check operation, which applies the electrical design rules to the physical design layout having been inserted with the selected filler cells.

17. The apparatus of claim 12, wherein the extracted characteristics of the cells abutting the vacant regions include at least one of threshold voltages of the cells and the sizes of the cells.

\* \* \* \* \*